(12) United States Patent
In et al.

(10) Patent No.: US 9,240,218 B2
(45) Date of Patent: Jan. 19, 2016

(54) MOBILE TERMINAL AND CONTROL METHOD OF MOBILE TERMINAL

(75) Inventors: Seunghee In, Seoul (KR); Silhee Sung, Busan (KR); Yeaeun Kwon, Yongin (KR); Nayeoung Kim, Cheonan (KR); Sesook Oh, Chungcheongnam-do (KR); Yunjueng Mhun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 13/343,303

(22) Filed: Jan. 4, 2012

(65) Prior Publication Data

US 2013/0024805 A1  Jan. 24, 2013

(30) Foreign Application Priority Data

Jul. 19, 2011  (KR) ........................ 10-2011-0071676

(51) Int. Cl.
| | |
|---|---|
| G06F 3/048 | (2013.01) |
| G11B 27/34 | (2006.01) |
| G06F 3/0488 | (2013.01) |
| G06F 3/0483 | (2013.01) |
| G06F 3/0484 | (2013.01) |

(52) U.S. Cl.
CPC .............. *G11B 27/34* (2013.01); *G06F 3/0483* (2013.01); *G06F 3/04845* (2013.01); *G06F 3/04883* (2013.01); *G06F 3/04886* (2013.01); *G06F 2203/04803* (2013.01)

(58) Field of Classification Search
USPC .......................................... 715/781, 863, 718
See application file for complete search history.

(56) References Cited

U.S. PATENT DOCUMENTS

| | | | |
|---|---|---|---|
| 5,633,678 A | 5/1997 | Parulski et al. | 348/232 |
| 6,334,025 B1 | 12/2001 | Yamagami | 386/96 |
| 7,131,067 B1 * | 10/2006 | Ikeda | 715/209 |
| 7,443,418 B2 | 10/2008 | Bryant et al. | 348/207.1 |
| 7,986,298 B1 * | 7/2011 | Dulaney et al. | 345/156 |
| 2003/0218624 A1 | 11/2003 | Quintana et al. | 345/716 |
| 2004/0201691 A1 | 10/2004 | Bryant et al. | 348/207.1 |
| 2006/0284852 A1 | 12/2006 | Hofmeister et al. | 345/173 |
| 2008/0005678 A1 * | 1/2008 | Buttner et al. | 715/744 |
| 2008/0019591 A1 * | 1/2008 | Iwayama et al. | 382/187 |
| 2008/0158189 A1 | 7/2008 | Kim | 345/173 |
| 2008/0174687 A1 * | 7/2008 | Shimizu | 348/333.02 |

(Continued)

FOREIGN PATENT DOCUMENTS

| | | |
|---|---|---|
| CN | 101359334 | 2/2009 |
| CN | 101997969 | 3/2011 |

(Continued)

OTHER PUBLICATIONS

Wang et al., ARISTA—image search to annotation on billions of web photos, Jun. 2010, Computer Vision and Pattern Recognition 2010 IEEE Conference, pp. 2987-2994.*

(Continued)

*Primary Examiner* — Linh K Pham
*Assistant Examiner* — Tam Tran
(74) *Attorney, Agent, or Firm* — Ked & Associates, LLP

(57) ABSTRACT

The present invention relates to a mobile terminal displaying an image and a control method of the same. A mobile terminal according to an aspect of the invention may include: a display unit displaying an image; and a controller receiving data according to a user's selection, storing the data to be associated with the image, and displaying an icon on the display unit to indicate that the data is stored.

14 Claims, 16 Drawing Sheets

(56) References Cited

U.S. PATENT DOCUMENTS

| | | |
|---|---|---|
| 2009/0067757 A1* | 3/2009 | Lee ................................. 382/311 |
| 2009/0154761 A1* | 6/2009 | Goh et al. ....................... 382/100 |
| 2009/0199098 A1 | 8/2009 | Kweon et al. .................. 715/716 |
| 2009/0207142 A1 | 8/2009 | Keranen ......................... 345/173 |
| 2009/0249235 A1 | 10/2009 | Kim et al. ...................... 715/765 |
| 2009/0324137 A1* | 12/2009 | Stallings et al. ............... 382/306 |
| 2010/0085383 A1 | 4/2010 | Cohen et al. ................... 345/660 |
| 2010/0149211 A1* | 6/2010 | Tossing et al. ................. 345/628 |
| 2010/0157095 A1 | 6/2010 | Karn et al. ................... 348/231.1 |
| 2010/0257447 A1* | 10/2010 | Kim et al. ...................... 715/702 |
| 2011/0124376 A1 | 5/2011 | Kim et al. ...................... 455/566 |
| 2011/0185318 A1* | 7/2011 | Hinckley et al. ............... 715/863 |
| 2011/0227810 A1* | 9/2011 | McKinney et al. ............. 345/1.3 |
| 2012/0192118 A1* | 7/2012 | Migos et al. ................... 715/863 |

FOREIGN PATENT DOCUMENTS

| | | |
|---|---|---|
| CN | 102035935 | 4/2011 |
| WO | WO 2011/019467 A1 | 2/2011 |

OTHER PUBLICATIONS

Chow et al., Content-BAsed Tag Generation for the Grouping of Tags, Feb. 2009, Mobile—Hybrid—and On-line Learning ELML '09 International Conference, pp. 7-12.*

European Search Report dated Oct. 10, 2012 issued in Application No. 11 01 0094.

European Search Report dated Jan. 4, 2013 issued in Application No. 11 01 0094.

Chinese Office Action issued in related Application No. 201210078299.3 dated Dec. 17, 2013.

* cited by examiner

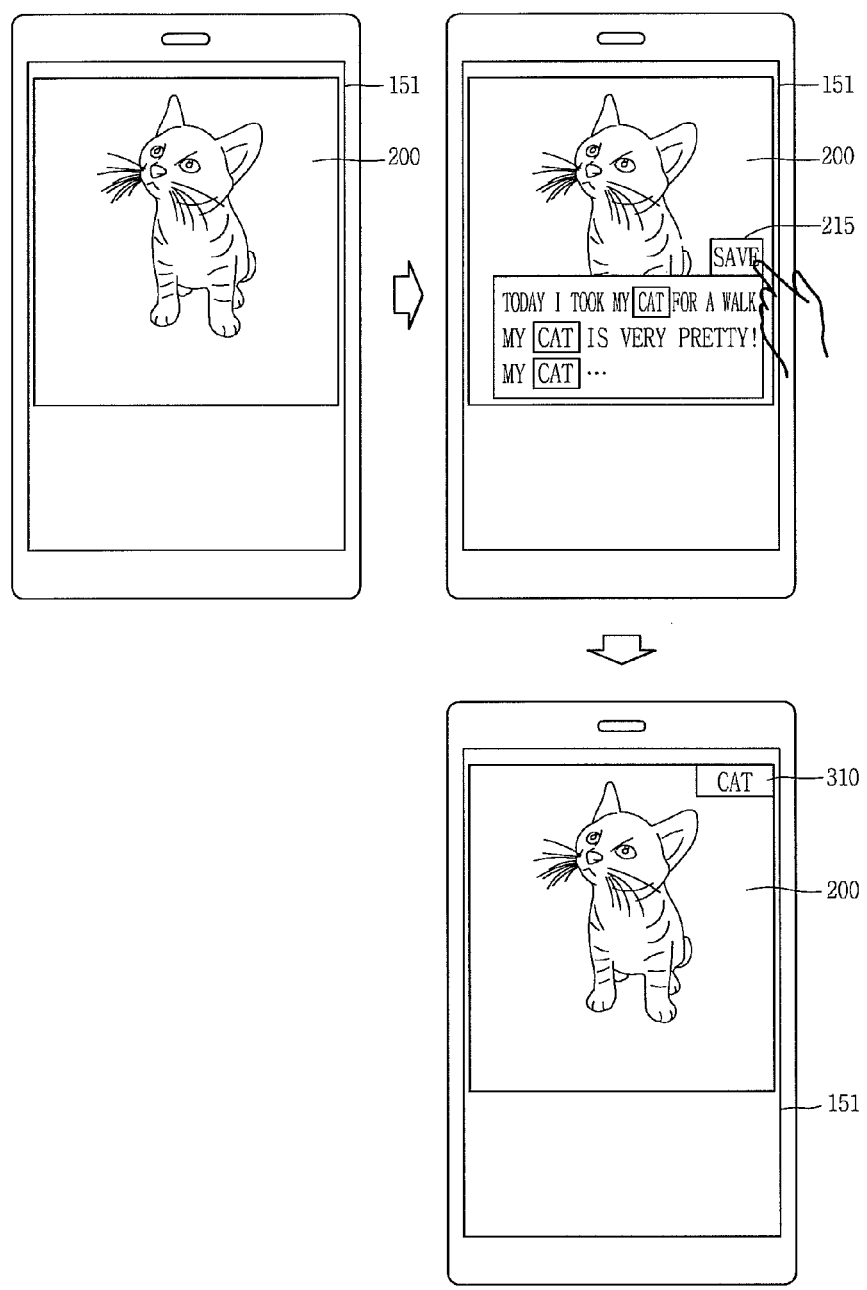

MOBILE TERMINAL AND CONTROL METHOD OF MOBILE TERMINAL

CROSS-REFERENCE TO RELATED APPLICATION

Pursuant to 35 U.S.C. §119(a), this application claims the benefit of earlier filing date and right of priority to Korean Application No. 10-2011-0071676 filed on Jul. 19, 2011, the contents of which is incorporated by reference herein in its entirety.

BACKGROUND OF THE INVENTION

1. Field of the Invention

The present invention relates to a mobile terminal displaying an image and a control method of mobile terminal.

2. Background of the Invention

A mobile terminal is a portable electronic device that has at least one of voice and video call function, information input/output function, and data storage function.

In line with the diversification of functions, mobile terminals have been manufactured in the form of multimedia players that have complex functions including capturing images or videos, playing music or video files, games, broadcast reception, and Internet connection.

New, various attempts have been made by hardware or software to implement the complex functions of these multimedia players.

In order to support and increase the functions of mobile terminals, the improvement of the structural and/or software aspect of terminals may be considered.

In addition, when a photo is displayed in a mobile terminal, a method of efficiently searching data stored in association with the displayed photo is needed.

SUMMARY OF THE INVENTION

Therefore, an aspect of the detailed description is to provide a mobile terminal capable of conveniently inputting information associated with an image being displayed, and a control method of the same.

An aspect of the detailed description also provides a mobile terminal allowing a user to easily access functions and information associated with the image being displayed, and a control method of the same.

To achieve these and other advantages and in accordance with the purpose of this specification, as embodied and broadly described herein, there is provided a mobile terminal including: a display unit displaying an image; and a controller receiving data according to a user's selection, storing the data to be associated with the image, and displaying an icon on the display unit to indicate that the data is stored.

A tag related to the data may be displayed on the icon.

The tag may be extracted from the data according to a predetermined criterion.

The controller may display the data on the display unit according to selection of the icon.

When a plurality of data items are stored in association with the image, a plurality of tags respectively related to the plurality of data items may be displayed on the display unit, and when one of the plurality of tags is selected, a data item related to the selected tag may be displayed.

The display unit may support touch input, and the controller may display an input window to which the data is input according to touch of the image.

The controller may set a size of the input window according to a touch length of the touch.

The touch may start at a first point and end at a second point, and the size of the input window may gradually increase in a direction of the touch from the first point toward the second point.

The input window may be displayed to overlap with the image, and the size of the input window may be changed again according to dragging with respect to the input window.

The input window may receive a command, the controller may compare the command input to the input window with a predetermined control command, and the controller may execute a function corresponding to the command when the command is the predetermined control command.

The icon may be an output icon to output the data, and a function icon representing a function related to the image may further be displayed on the display unit.

A predetermined SNS site may be displayed on the function icon, and the image and the data stored in association with the image may be uploaded to the predetermined SNS site when the function icon is selected.

The output icon and the function icon may be displayed at different corners of the image.

The controller may output a display window displaying the data according to selection of the icon, and when touch corresponding to predetermined symbols is sensed on the display window, the controller may execute functions defined in the predetermined symbols.

The data may be deleted when a touch corresponding to any one of the predetermined symbols is sensed.

According to another aspect of the present invention, there is provided a control method of a mobile terminal having a display unit displaying an image, the control method including: receiving data according to a user's selection; storing the data to be associated with an image displayed on the display unit; and displaying an icon on the display unit to indicate that the data is stored.

A tag related to the data may be displayed on the icon.

The data may be displayed when the icon is selected.

An input window to which the data is input may be displayed according to touch with respect to the image, the touch may start at a first point and end at a second point, and the input window may gradually change in size in a direction of the touch from the first point toward the second point.

The icon may be an output icon to output the data, a function icon representing a function related to the image may further be displayed on the display unit, and the output icon and the function icon may be displayed at different corners of the image.

A display window displaying the data may be output to the display unit according to selection of the icon, and when touch corresponding to a predetermined symbol is sensed, a function defined in the predetermined symbol may be executed.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 4A, 4B, 4C, and 4D are conceptual views illustrating a method of displaying a tag in a mobile terminal according to an exemplary embodiment disclosed in this specification;

DETAILED DESCRIPTION OF THE INVENTION

Figure 1:
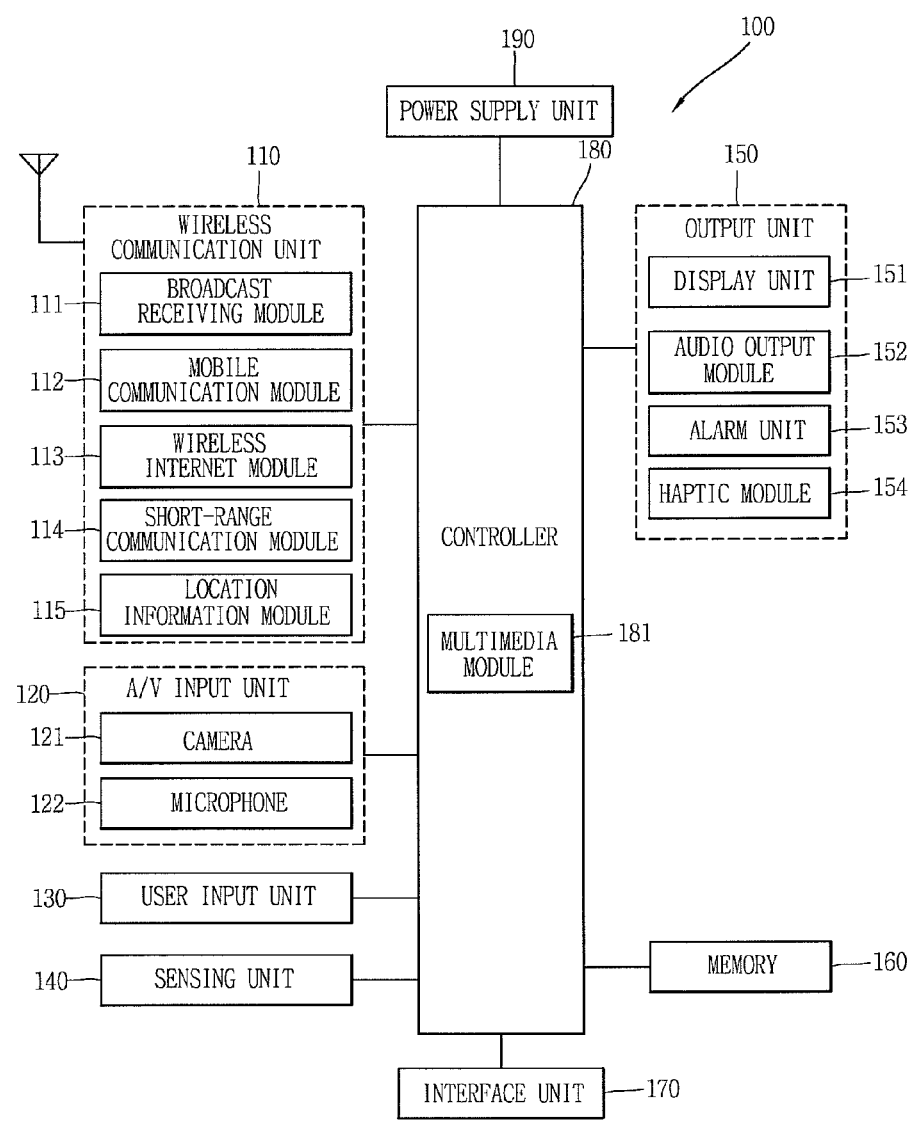
FIG. 1 is a block diagram illustrating a mobile terminal according to an exemplary embodiment of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings The suffixes attached to components of the mobile terminal, such as 'module' and 'unit or portion' were used for facilitation of the detailed description of the present disclosure. Therefore, the suffixes do not have different meanings from each other. The same reference numerals will be given to the same components as those of the aforementioned embodiment, and their explanations will be omitted. The singular expression of the present disclosure may include a plural concept unless distinctively differently defined.

The mobile terminal according to the present disclosure may include a portable phone, a smart phone, a laptop computer, a digital broadcasting terminal, Personal Digital Assistants (PDA), Portable Multimedia Player (PMP), a navigation system, etc., and a fixed terminal such as a digital TV, a desktop computer, etc.

FIG. 1 is a block diagram of a mobile terminal according to one embodiment of the present disclosure.

The mobile terminal 100 may comprise components, such as a wireless communication unit 110, an AudioNideo (AN) input unit 120, a user input unit 130, a sensing unit 140, an output unit 150, a memory 160, an interface unit 170, a controller 180, a power supply unit 190 and the like.

FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing entity via a broadcast channel.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®) integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as a part of the alarm unit 153.

The haptic module 154 generates various tactile effects which a user can feel. A representative example of the tactile effects generated by the haptic module 155 includes vibration. Vibration generated by the haptic module 155 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory in operation SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

In addition, the controller 180 receives data according to a user's selection while an image is being displayed on the display unit 151, and stores the input data to be associated with the displayed image.

The controller 180 may display an icon 310 on an image 200 to inform the user that the data has been stored in association with the image 200.

In addition, part of the stored data, that is, a tag or a keyword containing contents related to the data may be displayed on the icon 310 displayed on the image 200.

Here, a tag is a kind of group of keywords to which words related to data, for example, a text showing keywords representing the data and the like is input. Tags may be input by the user or be automatically set by the controller.

In addition, the tag or the keyword may be expressed as metadata. Here, metadata refers to, for example, data that describes data stored in association with an image and is used to search tag or keyword information with efficiency.

A method of inputting data in a mobile terminal according to an aspect of the invention and storing the input data to be associated with the image will now be described with reference to FIGS. 2 and 3.

Figure 2:
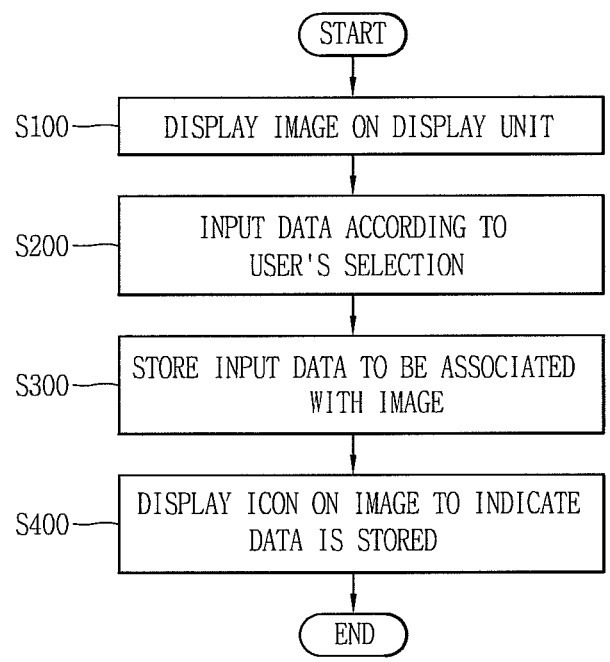
FIG. 2 is a flowchart illustrating a control method of a mobile terminal according to an exemplary embodiment disclosed in this specification.

FIG. 2 is a flowchart illustrating a control method of a mobile terminal according to an exemplary embodiment disclosed in this specification. FIG. 3 is a conceptual view illustrating a control method of a mobile terminal according to an exemplary embodiment disclosed in this specification.

The mobile terminal according to this embodiment has the display unit 151 arranged on one face, for example, a front face thereof, and the display unit 151 supports touch input.

Figure 3:
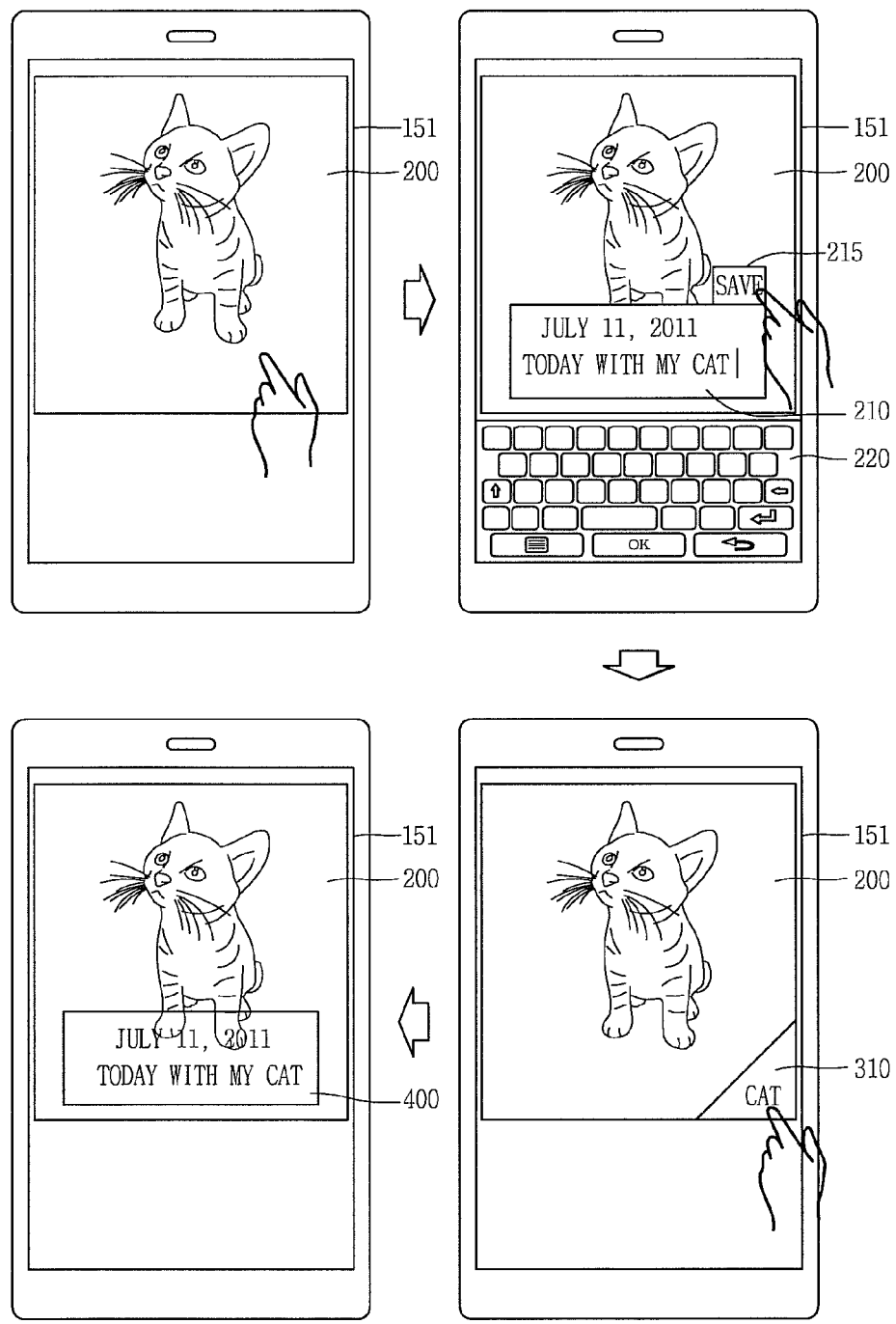
FIG. 3 is a conceptual view illustrating a control method of a mobile terminal according to an exemplary embodiment disclosed in this specification.

First, as shown in FIG. 3, according to the control method, the controller 180 displays the image 200 on the display unit 151 according to the user's selection in operation S100.

The image, 200 displayed on the display unit 151, may be an image selected by the user among images stored in the memory 160 or an image displayed on a web page connected through wired/wireless communication and downloaded.

In addition, while the image 200 is being displayed on the display unit 151, the controller 180 displays an input window 210 to which data can be input according to the user's selection, and receives data from the user in operation S200 (see FIG. 2).

Here, the user's selection may include selecting a data input icon that is displayed on the image 200 to allow the user to leave a note while the image 200 is being displayed.

For example, referring to FIG. 3, while an image is being displayed, an icon 213 to add a note is selected by the user, the controller 180 outputs the input window 210 to the display unit 151. In addition, data that is input by the user using the user input unit 130 (see FIG. 1), for example, a virtual keyboard 220 is output to the input window 210.

Here, data may be a text, that is, a note that is input by the user or the controller 180 or one of the image, video, and audio files being attached.

For example, when the user inputs text data, "with my cat" by using the virtual keyboard 220 shown on the display unit 151, the text data is shown on the input window 210 as shown in FIG. 3.

Then, when the user selects storing the text data, the controller 180 stores the text data to be associated with the image 200 displayed on the display unit 151 in operation S300 (see FIG. 2).

For example, as shown in FIG. 3, after the text data is input by the user, if the users clicks a "save" icon 215, the controller 180 stores the text data, displayed on the input window 210, to the memory 160 (see FIG. 1) in connection with the image 200 displayed on the display unit 151.

Here, in addition to using the icon 215 displayed on the display unit 151, the text data may also be stored when the user touches an area in which the input window 210 is not displayed without displaying the icon 215.

As described above, when the data input by the user is stored to be associated with the image 200 displayed on the display unit 151 in operation S300, the controller 180 displays the icon 310 on an area of the image 200 to indicate that the data has been stored in connection with the image in operation S400 (see FIG. 2).

In addition, a tag containing information relevant to the data may be displayed on the icon 310. A method of displaying a tag will be described below in more detail with reference to FIGS. 4A to 4D.

Meanwhile, as described above, the controller 180 displays the icon 310 to indicate that data is stored on the image 200, it becomes easier to inform the user that the data related to the image 200, for example, a note is present.

In addition, as shown in FIG. 3, when the icon 310 displayed on the image 200 is selected by the user, the controller 180 may display the data corresponding to the icon 310.

Here, the data to be displayed may overlap with the image 200. The data may be displayed through a display window 400 that overlaps with the image 200. The controller 180 may control the size of the display window 400 according to the amount of data.

The method of displaying a tag showing information related to the stored data on the icon 310 shown on the image 200 will now be described with reference to FIGS. 4A, 4B, 4C, and 4D.

FIGS. 4A to 4D are conceptual views illustrating a method of displaying a tag in a mobile terminal according to an exemplary embodiment disclosed in this specification.

As described above, the mobile terminal according to this embodiment may store data to be associated with the image, and the controller 180 outputs the icon 310 to the display unit 151 to indicate that the data stored in association with the image 200 is present. In addition, the controller 180 may display a keyword or a tag (hereinafter, collectively referred to as a "tag") corresponding to the data on the icon 310.

A tag to be shown on the icon 310 may be automatically set by the controller 180 according to the data content or may be directly input by the user.

First, a method of automatically setting a tag by the controller 180 will be described with reference to FIG. 4A.

The image 200 is displayed on the display unit 151, the input window 210 is displayed according to a user's selection, data is input from the user, and the data is stored according to the user's selection.

When the data shown on the input window 210 is stored, the controller 180 extracts part of the data according to a predetermined criterion and displays the extracted part on the icon 310 shown on the display unit 151.

Here, the predetermined criterion is a basis on which a tag is extracted from data. For example, when the data is text data, the most mentioned word in texts may be extracted as a tag.

For example, as shown in FIG. 4A, as the most mentioned word in text data shown on the input window 210 is "cat," the controller 180 may extract the most mentioned word "cat" from the data and set the extracted word to be displayed as a tag on the icon 310.

In addition, when the most mentioned text is set as a tag, in order that a meaning text is set as a tag, the controller 180 may set to exclude "particles" from the criterion on which a tag is extracted.

Here, a "particle" is attached to a free morpheme in a sentence to define the grammatical relationship between one word to which the particle is attached and another word or add meaning.

In addition, in another example, criteria on which a tag is extracted may be the first text of the input data or a date when data is input.

Also, when the input data is not text data but data such as images, audios or videos, the controller 180 may set such that an image thumbnail of the data or an image representing attributes of the data can be extracted as a tag.

Moreover, in the present invention, in addition to the above-described embodiments, various criteria on which a tag is extracted from the input data may be set. At least one criterion may be selected by the user from the criteria so a tag is extracted according to the selected criteria.

A method of directly receiving a tag from a user will now be described with reference to FIG. 4B.

Figure 4B:
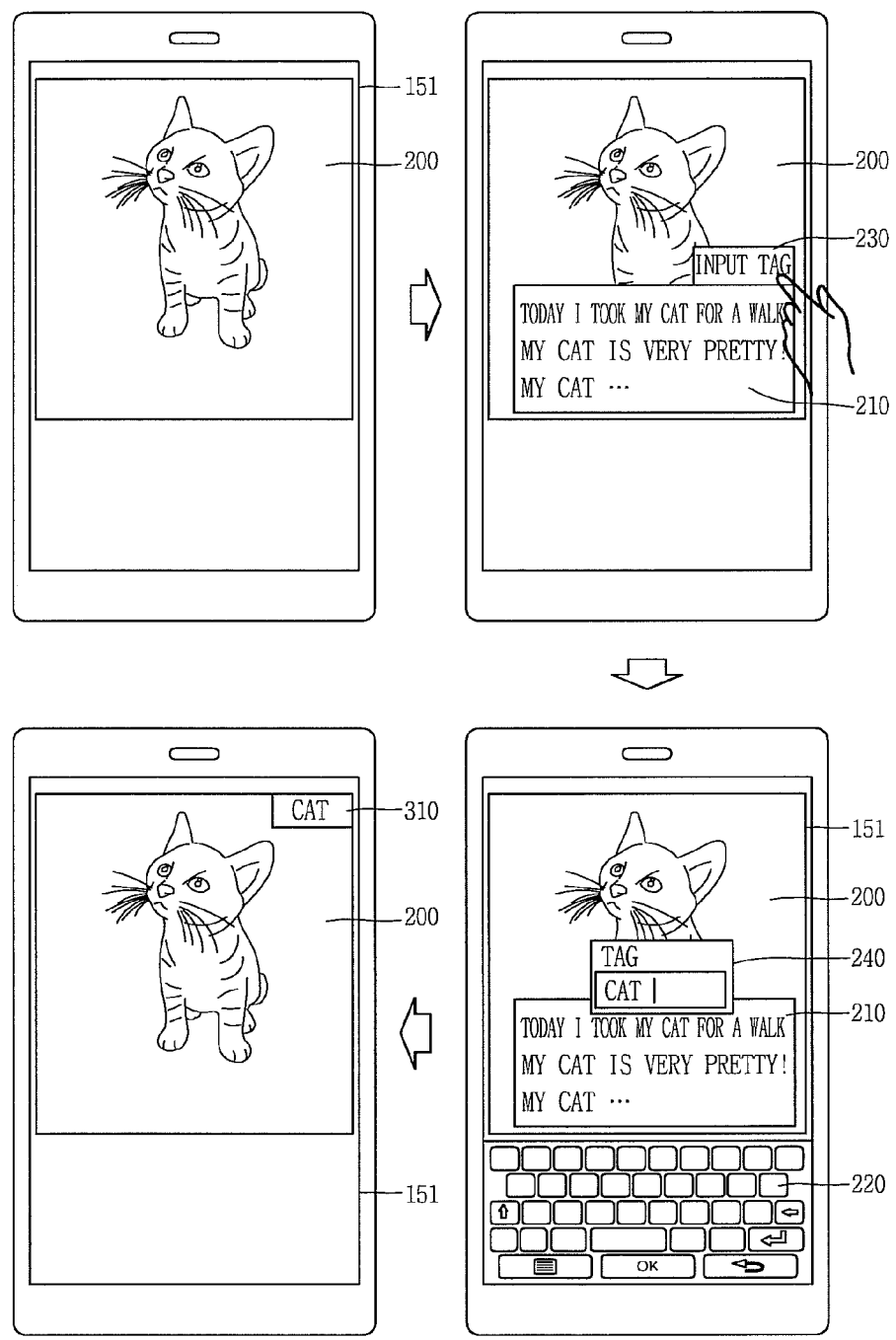

As shown in FIG. 4B, the image 200 is displayed on the display unit 151, and according to a user's selection, for example, when touch input is sensed with respect to the image 200 or the display unit 151, the input window 210 to which data can be input is created.

When data received from the user is input to the input window 210, and an icon 230 related to tag input, shown on the display unit 151, is selected by the user, the controller 180 displays a tag input window 240 to which a tag can be input.

Then, when a text is input to the tag input window 240 by the user, the controller 180 sets the input text, for example, a text "cat" as a tag and outputs the set tag to the icon 310 shown on the display unit 151.

In addition, in another example in which a tag is directly received from the user, when part of the input data is dragged by the user, data corresponding to the dragged part may be set as a tag.

In addition to the above-described embodiments, a tag can be received from the user according to various methods.

In the mobile terminal according to this embodiment, as shown in FIGS. 4A and 4B, contents related to the data input by the user are set as a tag, which is then shown on the display unit, so that the user can easily access the content stored in conjunction with the image.

A method of displaying a plurality of tags on the display unit when a plurality of data items are stored to be associated with an image will now be described with reference to FIGS. 4C and 4D.

Figure 4C:
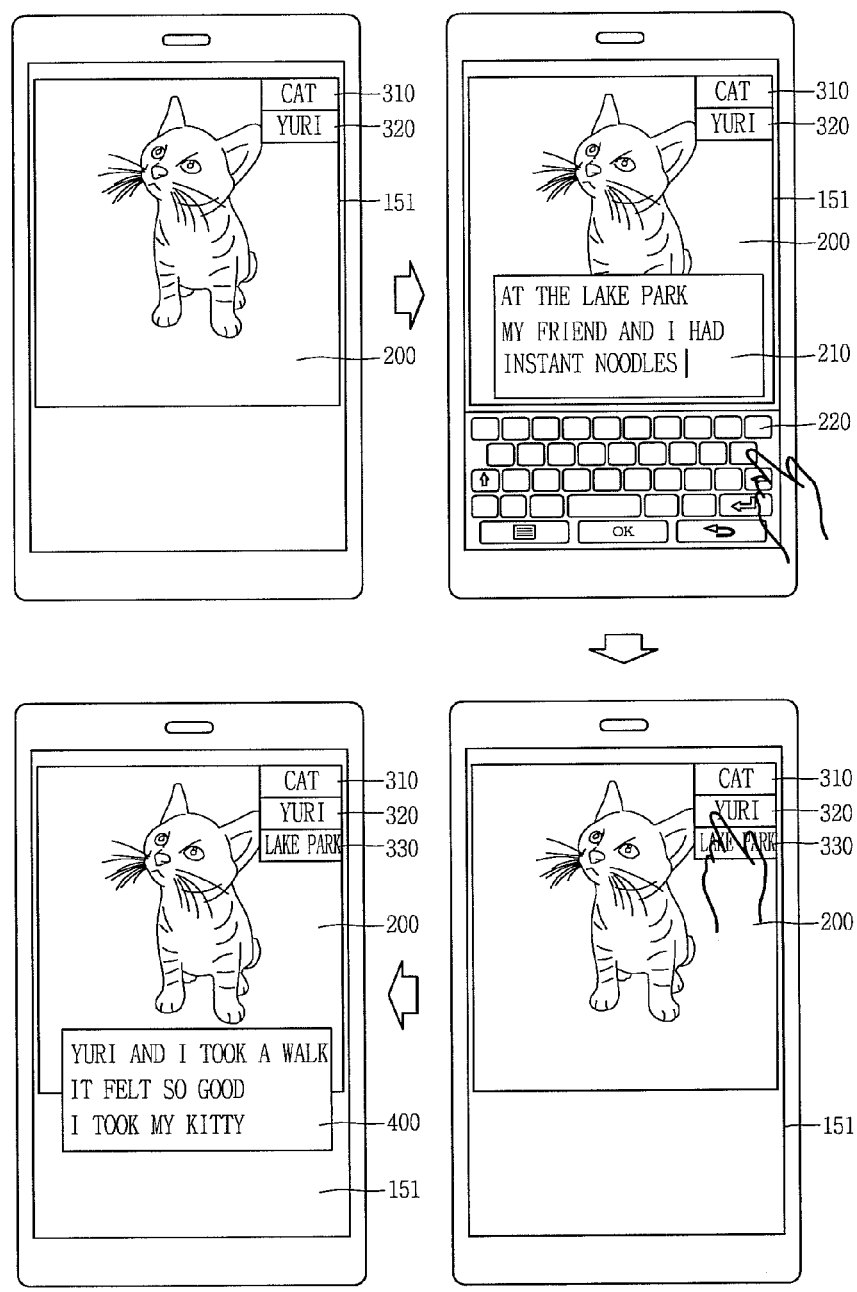

First, as shown in FIG. 4C, when a plurality of data items are input in association with the image 200 displayed on the display unit 151, tags 310 and 320 related to the respective data items are displayed on the display unit 151.

For example, when two "note" data items are input in association with the image 200 displayed on the display unit 151, and tags corresponding to the two note data items are set by the user or the controller 180 as described above, the controller 180 displays the tag "cat" 310 and the tag "Yuri" 320 on the display unit 151.

As such, the tags corresponding to the individual notes are shown on the display unit 151, so that the user can easily find out the notes stored in association with the image 200 and search desired notes with ease.

In addition, when another data item is input with respect to the image 200, for example, another note is input to the input window 210 according to a user's selection, and a tag "lake park" 330 is set, the controller 180 displays the tag "lake park" 330 along with the tag "cat" 310 and the "Yuri" tag 320, previously displayed, on the display unit 151.

In addition, when one tag is selected by the user among the tags 310, 320, and 330, the controller 180 may display data corresponding to the selected tag on the display unit 151.

For example, when the user selects the tag "Yuri" 320 among the plurality of tags 310, 320, and 330, the controller 180 displays the note corresponding to the tag "Yuri" 320 on the display unit 151 through the display window 400.

Figure 4D:
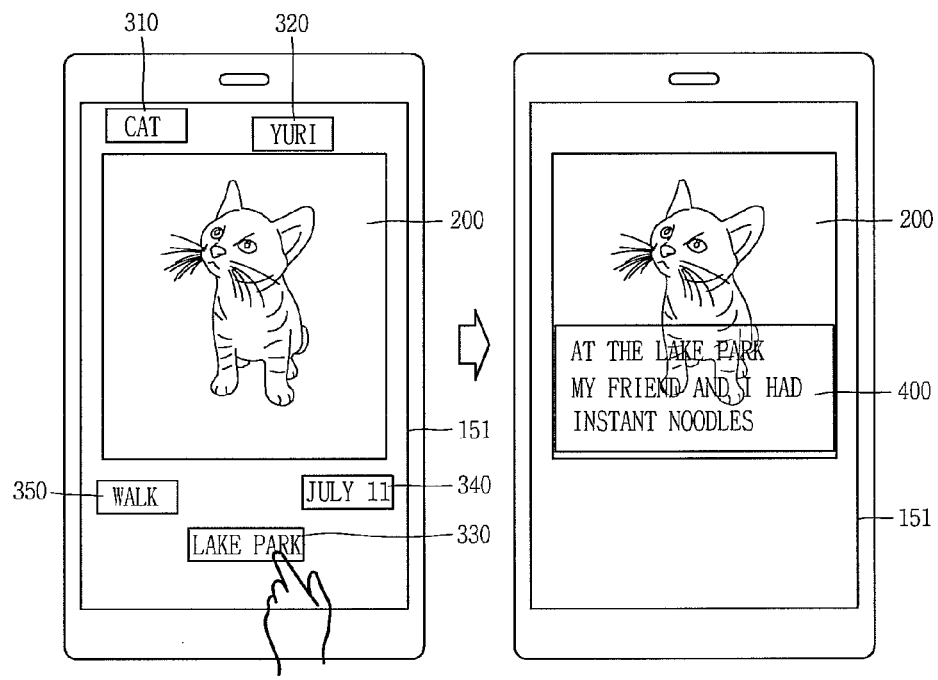

In addition, as shown in FIG. 4D, the plurality of tags may scatter on the display unit 151, providing the user with visual entertainment.

Also, as shown in FIG. 4D, when any one of the tags 310 to 350 scattering on the display unit 151 is selected, the controller 180 may display data corresponding to the selected tag on the display unit 151.

As described above, when a plurality of tags are set to one image, a plurality of icons may be shown on the display unit, and the plurality of tags may be output to the plurality of icons.

A method of displaying an input window to which data is received will now be described.

FIGS. 5A, 5B, 5C, 5D, and 5E are conceptual views illustrating a method of displaying an input window in a mobile terminal according to an exemplary embodiment disclosed in this specification.

When the image 200 is displayed, and data corresponding to the image 200 is input in the mobile terminal according to this embodiment, the controller 180 displays the input window 210 so that the data can be input to the input window 210.

The input window 210 may be created by a separate selection icon (not shown) displayed on the display unit 151 or according to touch input with respect to the display unit 151.

In addition, the controller 180 may set to display the input window 210 on the basis of touch input with respect to a region of the display unit 151, in which the image 200 is displayed, that is, with respect to the image 200.

The method of displaying the input window according to touch input with respect to the image will now be described in connection with FIGS. 5A, 5B, 5C, 5D, and 5E.

First, the controller 180 creates the input window 210 when touch input is sensed on the region in which the image 200 is shown.

The input window 210 may overlap with the image 200, and the transparency of overlap can be controlled by the user.

In addition, the input window 210 may be displayed on a region different form the image 200. Here, the display unit 151 may be divided into a region where the input window 210 is displayed and a region where the image 200 is displayed.

In this case, the image 200 may be reduced corresponding to the divided region, where the entire image may be shown. Alternatively, part of the image 200 may be shown corresponding to the reduced region.

In addition, the touch input may be predetermined touch input such as single touch or double touch.

Also, the controller 180 may create the input window 210 on the basis of the touch length or touch direction of sliding, flicking, or dragging input to the image 200.

Figure 5A:
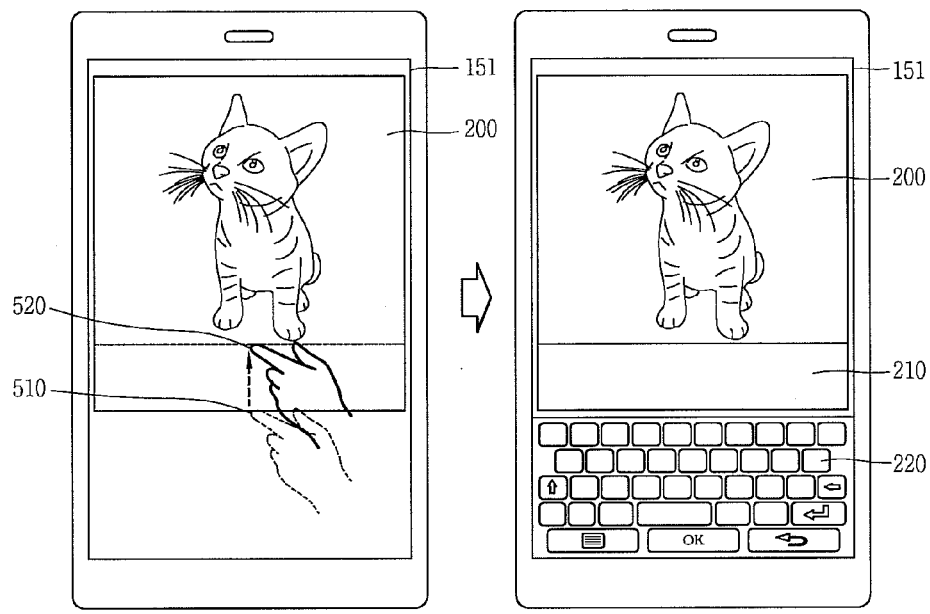
FIGS. 5A, 5B, 5C, 5D, and 5E are conceptual views illustrating a method of displaying an input window in a mobile terminal according to an exemplary embodiment disclosed in this specification.

For example, as shown in FIG. 5A, when dragging input from a first point 510 toward a second point 250 is sensed on the image 200 displayed on the display unit 151, the controller 180 displays the input window 210 on the display unit 151 according to the touch.

Here, the controller 180 displays the input window 210 in response to the dragging input with respect to the image 200 so that the user can view the gradual increase in the size of the input window 210, and the size of the window 210 can be controlled according to the touch length of the dragging input.

Figure 5B:
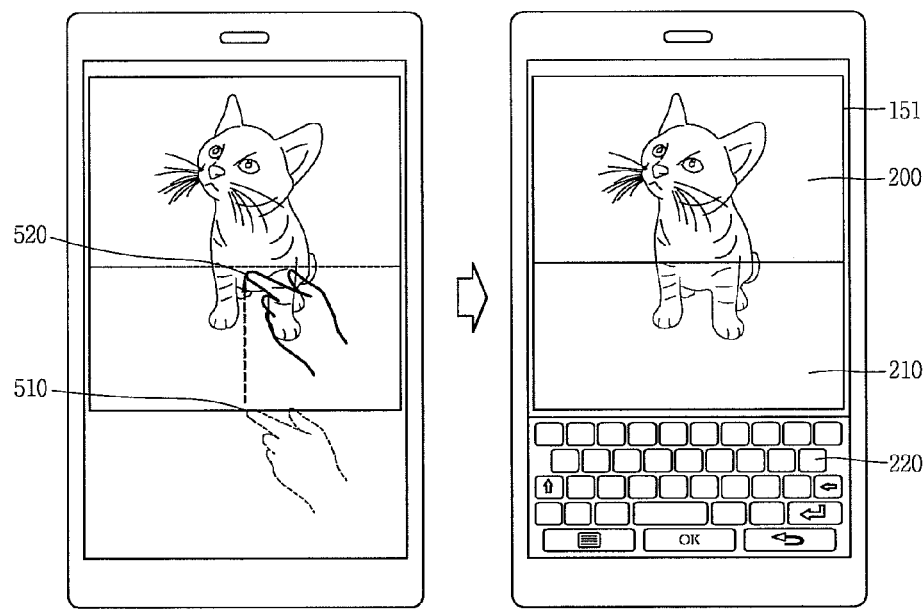
Figure 5C:
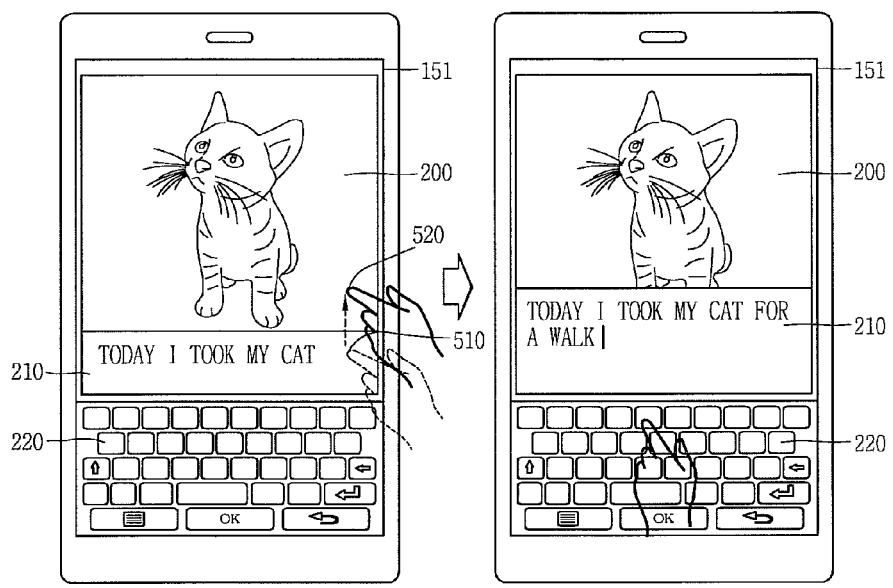

For example, with reference to FIGS. 5A and 5B, the touch length of the dragging input to the second image 200, displayed on the display unit 151, between the first point 510 and the second point 520 is greater than that of the dragging input as shown in FIG. 5A.

In this case, as shown in FIG. 5B, the controller 180 may display the size of the input window 210 with greater touch length, shown in FIG. 5B, to be larger than that of the input window 210, shown in FIG. 5A.

That is, the controller 180 displays the size of the input window 210 according to the touch length of the touch input sensed on the image 200, so that the user can freely control the size of the input window 210.

In addition, as described above, after the input window 210 is displayed on the basis of the touch sensed on the image 200, the size of the input window 210 may be changed again. The controller 180 may change the size of the input window 210 on the basis of touch input to the input window 210, for example, the dragging input from the first point 520 toward the second point 520.

Also, the method of creating the input window 210 and the shape of the input window 210 may be varied according to the touch direction as well as the touch length of dragging the image 200.

Figure 5D:
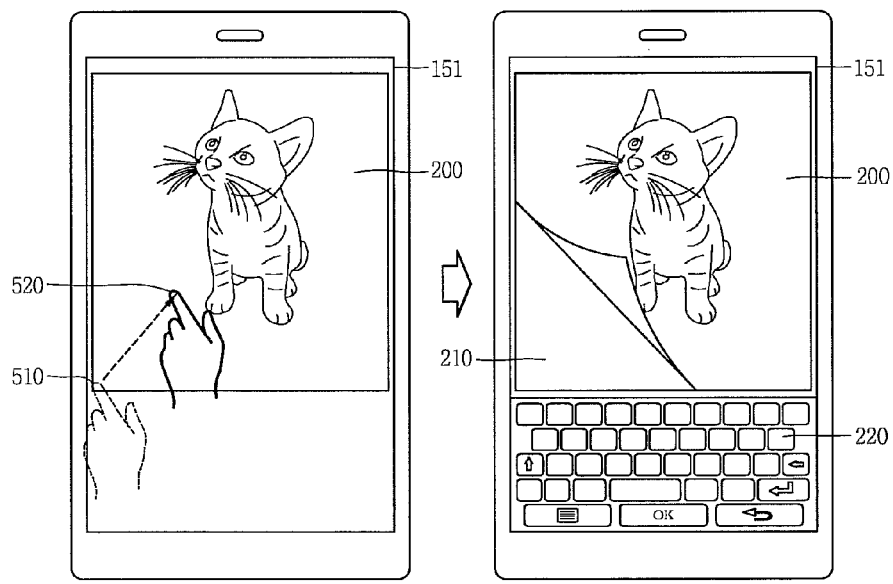

For example, as shown in FIG. 5D, when dragging input is sensed from the first point 510 at one corner of the image 200 toward the second point 520 at the opposite corner thereof, the controller 180 displays the input window 210 in the touch direction from the first point 510 to the second point 520.

That is, the input window 210 may be triangular as if one corner of the paper was folded.

Figure 5E:
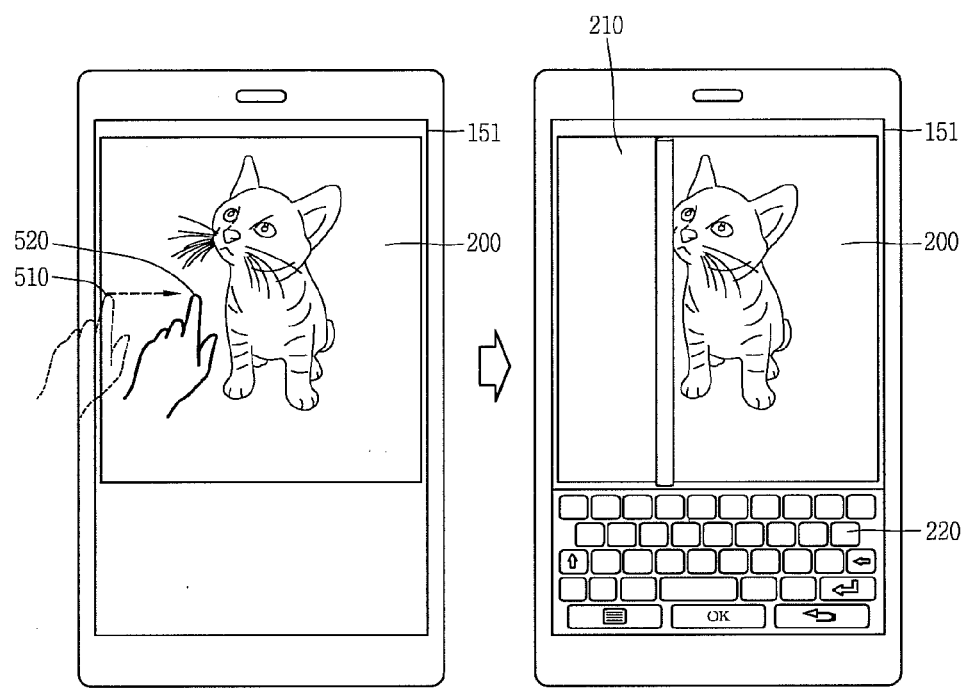

In addition, as shown in FIG. 5E, when dragging input from the first point 510 at the left edge of the image 200 toward the second point 520 located in the right horizontal direction is sensed, the controller 180 creates the input window 210 in the horizontal direction on the basis of the touch direction from the first point 510 toward the second pint 520.

In this case, in order to provide the user with visual entertainment, the controller 180 may display the input window 210, gradually increasing the size of the input window 210 in the touch direction.

In addition, the controller 180 may set to create the input window 210 only when touch input is sensed on a predetermined area of the image 200. For example, the controller 180 may create the input window 210 only when touch input is sensed on one area at the left edge of the image 200.

As described above, according to the mobile terminal and the control method of the same, the size and shape of the input window 210 can be varied according to various touch inputs with respect to the display unit 151.

A method of receiving a command through the input window 210 displayed on the display unit 151 and executing a function corresponding to the input command by the controller 180 will now be described in connection with FIGS. 6A and 6B.

Figure 6A:
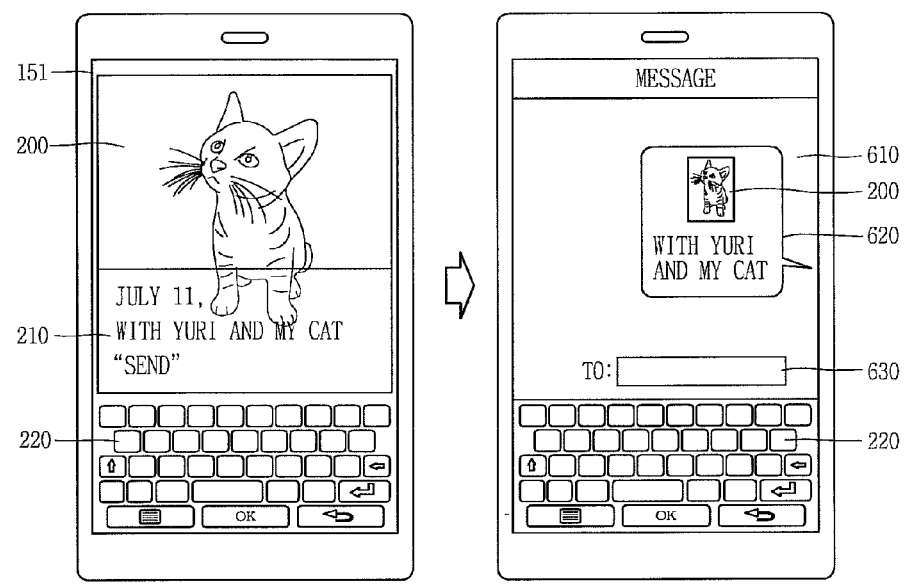
FIGS. 6A and 6B are conceptual views illustrating a method of using a command in a mobile terminal according to an exemplary embodiment disclosed in this specification.
Figure 6B:
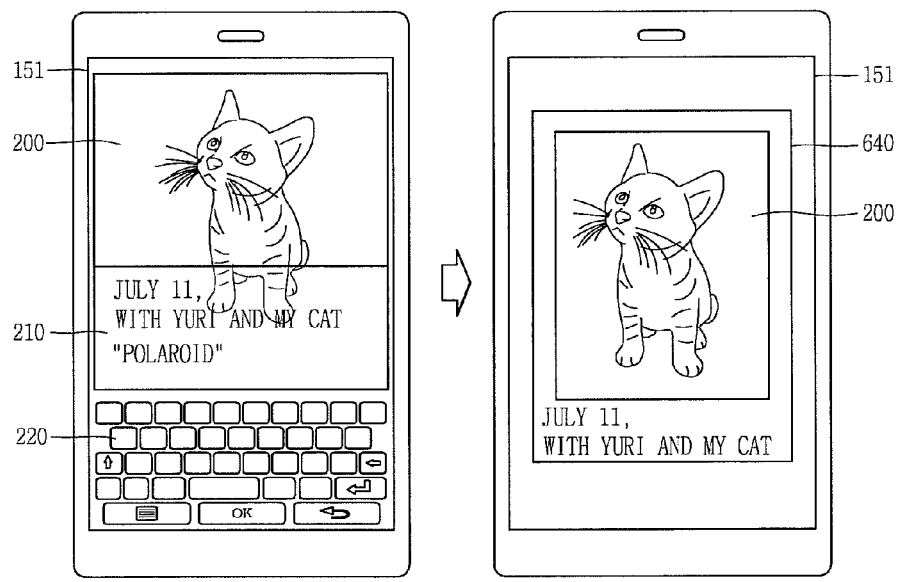

FIGS. 6A and 6B are conceptual views illustrating a method of using a command in a mobile terminal according to an exemplary embodiment disclosed in this specification.

When text data is input to the input window 210 displayed on the display unit 151 of the mobile terminal according to this embodiment from the user, and the input text data corresponds to a predetermined control command, the controller 180 may execute a function corresponding to the text data, that is, the command.

Here, a command is a text or a symbol agreed with the controller 180 in order to execute a certain function related to the image 200 displayed on the display unit 151. When the command is input, the controller 180 compares the command with a predetermined control command.

As a result of the comparison, when the command corresponds to the predetermined control command, the controller 180 executes a function corresponding to the command, that is, the control command.

As shown in FIG. 6A, when a text is located between double quotation marks, and the text along with the double quotation marks is input to the input window 210, the controller 180 executes a function corresponding to a predetermined control command related to the text by using the image 200.

For example, when a text "send a message," that is, a command is input to the input window 210, the controller 180 determines whether the text located between the double quotation marks corresponds to the predetermined control command. As a result of the determination, if the text corresponds to the predetermined control command, the controller 180 executes the function defined in the text.

For example, it is assumed that the function corresponding to the command "send a message" is sending an instant message along with the image 200 and data stored to be associated with the image 200.

When the command "send a message" is input to the input window 210, the controller 180 changes the screen of the display unit 151 to a message window 610 in order to send a message along with the data input to the input window 210, leaving the image 200 and the command. Then, the controller 180 outputs the image 200 and the input data as the content of a message 620.

Also, there are various commands such as call, add an event, and upload a webpage.

In another example, as shown in FIG. 6B, the command may be set to a control command that allows the user to directly add special effects to the image.

Here, special effects may include changing the density, texture, brightness, sharpness, saturation, contrast, and frame of the image 200.

For example, as shown in FIG. 6B, when a command "Polaroid" corresponding to special effects is input to the input window 210, the controller 180 checks a control command corresponding to the command and executes a function corresponding to the command.

Therefore, when the function corresponding to the command is executed, a frame 640 is shown on the image 200 to look like a Polaroid photo, and the text data input to the input window 210 may be shown on the frame 640.

As described above, according to the mobile terminal and the control method according to this embodiment, the command is input through the input window 210 to which data is input, and the function corresponding to the input command is executed, thereby preventing the inconvenience that the user executes the function by using a separate function window.

A method of executing a function related to an image by using an icon shown on the image will now be described.

Figure 7A:
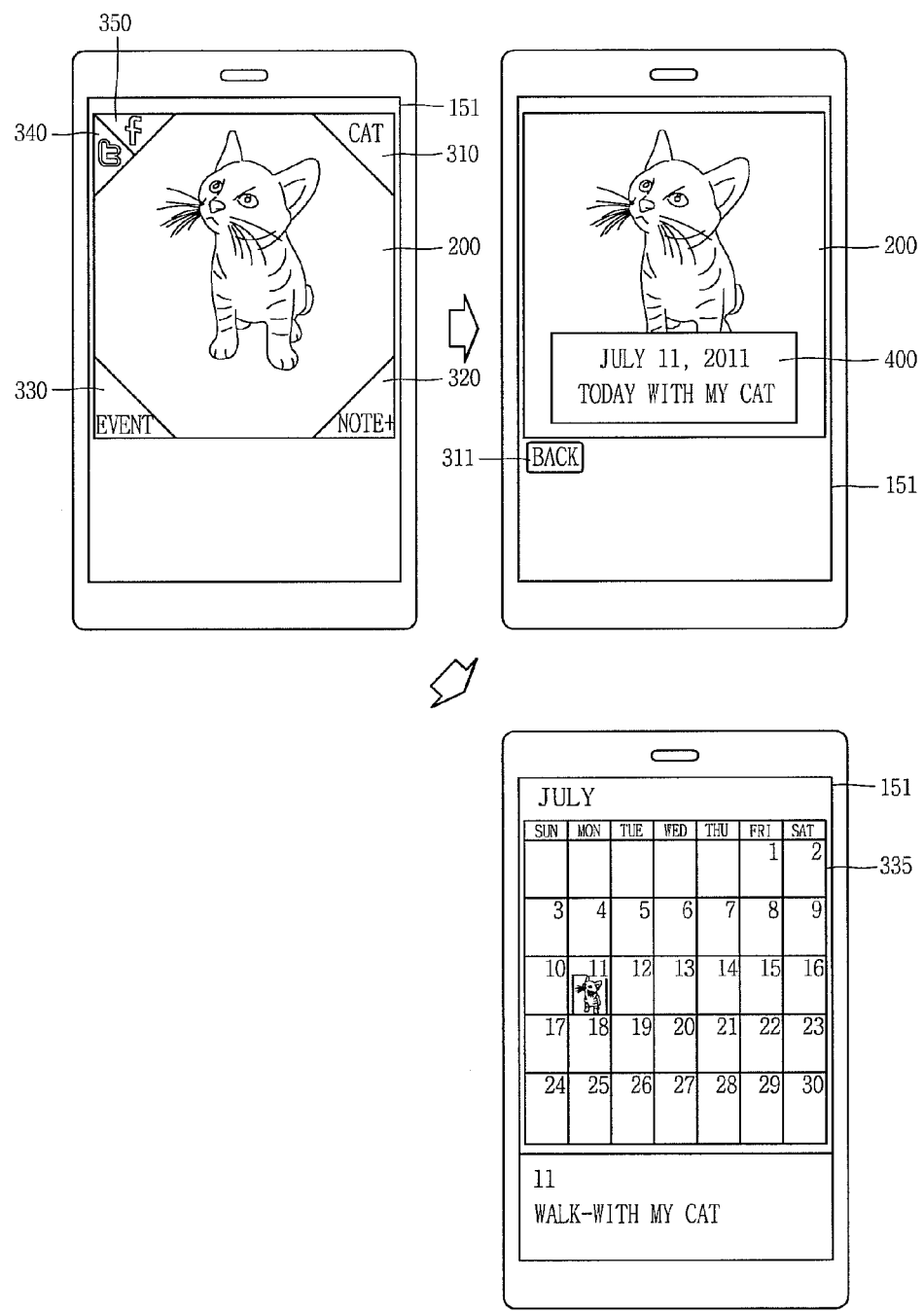
FIGS. 7A and 7B are conceptual views illustrating a method of displaying an icon in a mobile terminal according to an exemplary embodiment disclosed in this specification.
Figure 7B:
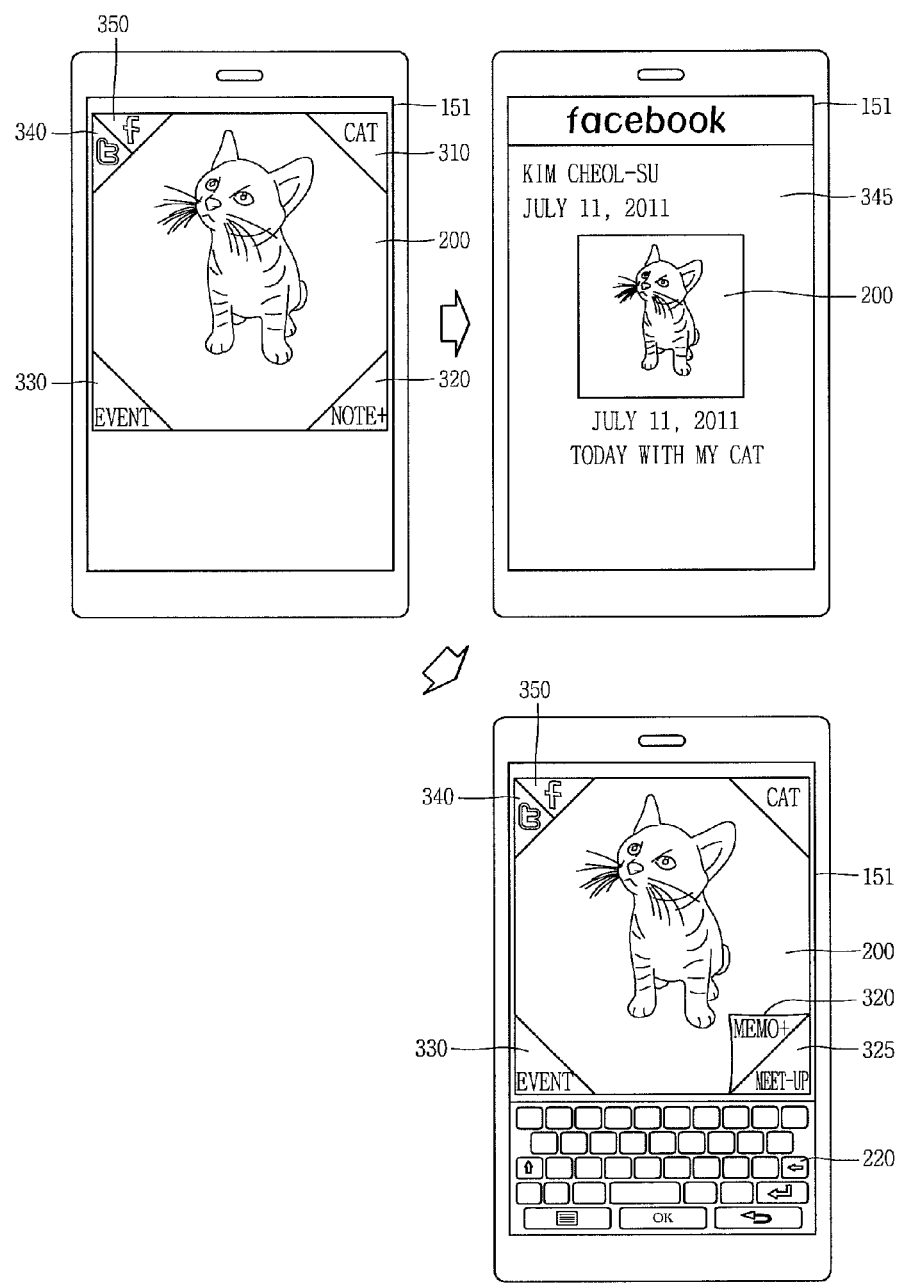

FIGS. 7A and 7B are conceptual views illustrating a method of displaying icons in a mobile terminal according to an exemplary embodiment disclosed in this specification.

When data related to the image 200 displayed on the display unit 151 is input and stored, the controller 180 of the mobile terminal according to this embodiment displays the icon 310 on display unit 151 to indicate that the data has been stored.

Also, the controller 180 may display at least one of the function icons 320 to 350 displaying functions or information related to the image shown on the display unit 151 in addition to the icon 310 (hereinafter, referred to as an "output icon") indicating the data has been stored.

In addition, the icon 310 and the function icons 320 to 350 may be shown on the image 200 displayed on the display unit 151. In particular, the icon 310 and the function icons 320 to 350 may be shown at the different corners of the image 200.

Also, these icons may be set not to be shown on the image 200 but set to be shown only when touch input is sensed on the image 200.

A detailed example in which icons are displayed on an image and functions related to the image are executed will now be described.

First, as shown in FIG. 7A, the output icon 310, the function icon 329 to receive data, the function icon 330 to add an event, and the function icons 340 and 350 representing SNS (Social Network Service) sites are shown at the different corners of the image 200 displayed on the display unit 151.

When the user selects the output icon 310 among the icons shown on the image 200, the controller 180 displays the data corresponding to the image 200 to a display window 400.

In addition, when the function icon 330 to add an event is selected by the user, the controller 180 may add the image 200 and the data stored in association with the image 200 to a calendar screen 335.

In this case, a date added to the calendar may be the date when the image 200 is stored or the data when the data is stored, which may be selected by the user.

As shown in FIG. 7B, when the function icon 350 related to the SNS site is selected by the user, the controller 180 may upload the image 200 and the data stored in association with the image 200 to a predetermined SNS site.

Here, the predetermined SNS site is set beforehand by the user and may be an SNS site connected with a user's account.

Therefore, as shown in FIG. 7B, when the function icon 350 related to

"Facebook" is selected, the display unit 151 is converted into a Facebook screen 345, and the image 200 and the data are uploaded to the Facebook screen 345. In addition, the controller 180 may also set to display the date when the image 200 is stored.

In addition, as shown in FIG. 7B, when the function icon 320 to add a note is selected by the user, the controller 180 may display an input window 325 to which a note is input. Also, the controller 180 may create the input window 325 at an area corresponding to the corner of the image 200 so that a note can be directly input to the corner of the image 200.

As described above, according to the mobile terminal and the control method according to this embodiment, function icons showing functions that can be executed in relation with the image are shown on the image, and the functions can be immediately executed through the function icons while the image is being displayed. Therefore, the user can execute various functions related to the image while the image is being displayed without a cumbersome process of executing the functions in a separate selection window.

A method of displaying data stored in association with the image will now be described with reference to FIGS. 8A, 8B, and 8C.

Figure 8A:
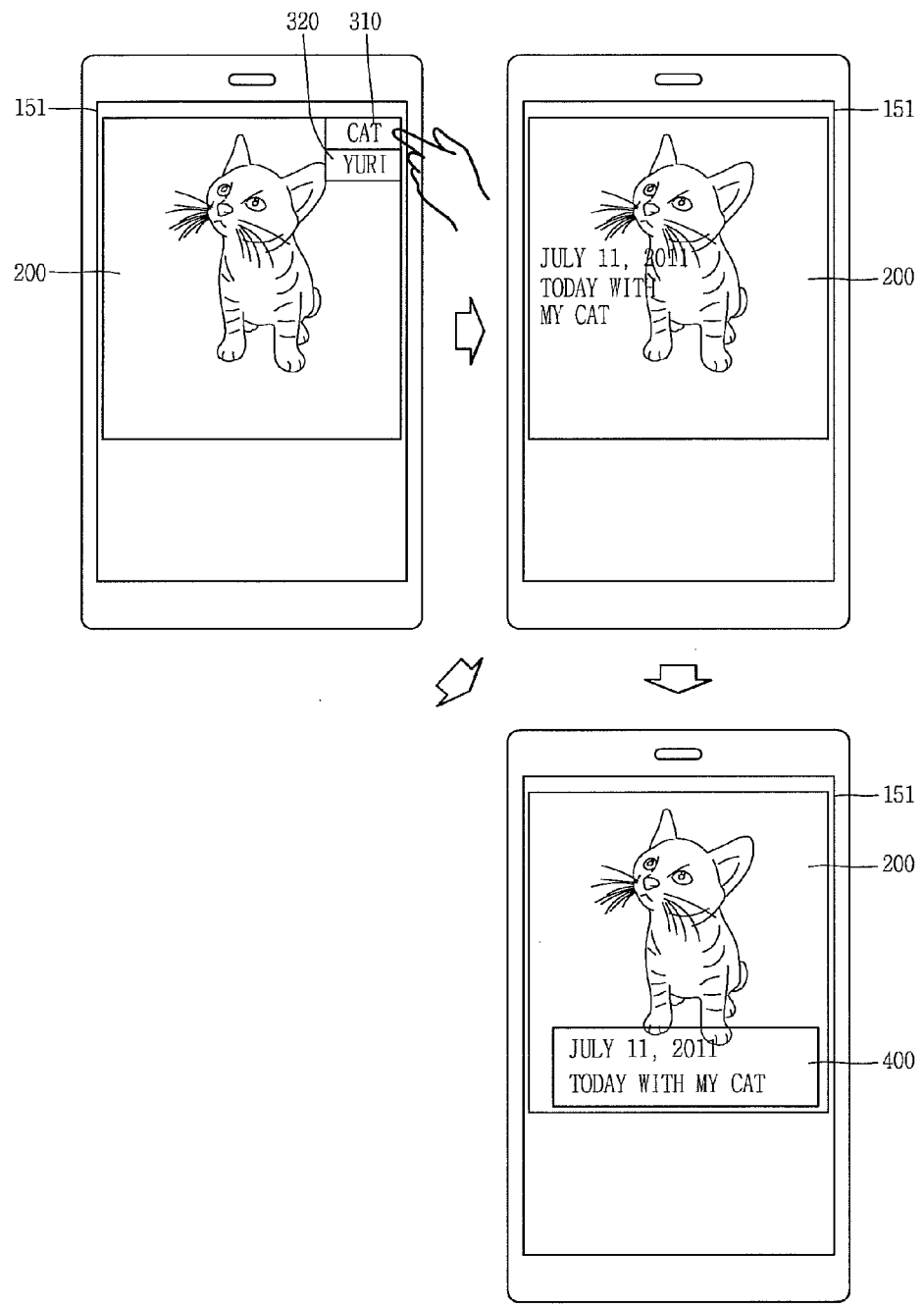
FIGS. 8A, 8B, and 8C are conceptual views illustrating a method of outputting stored data in a mobile terminal according to an exemplary embodiment disclosed in this specification.
Figure 8B:
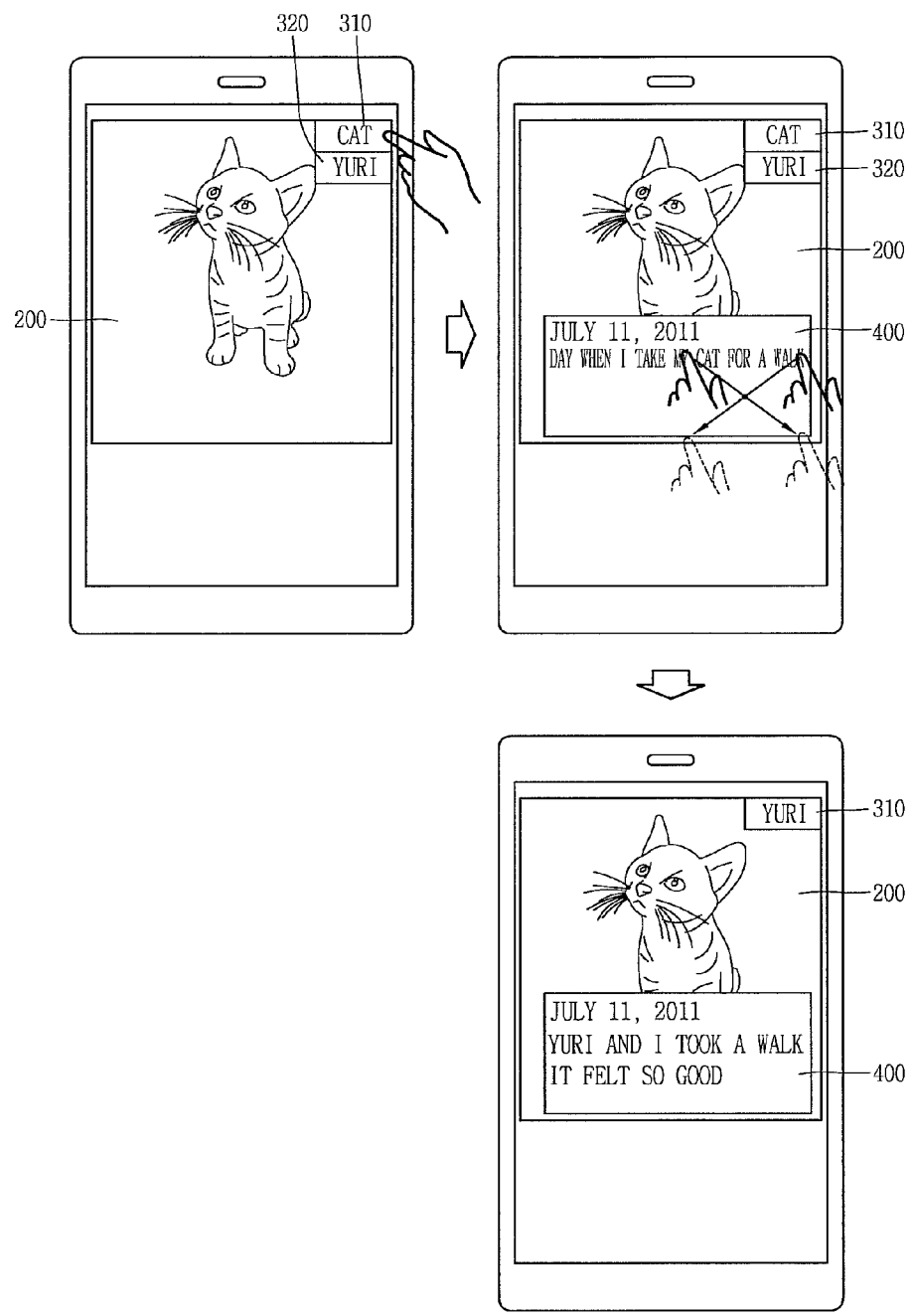
Figure 8C:
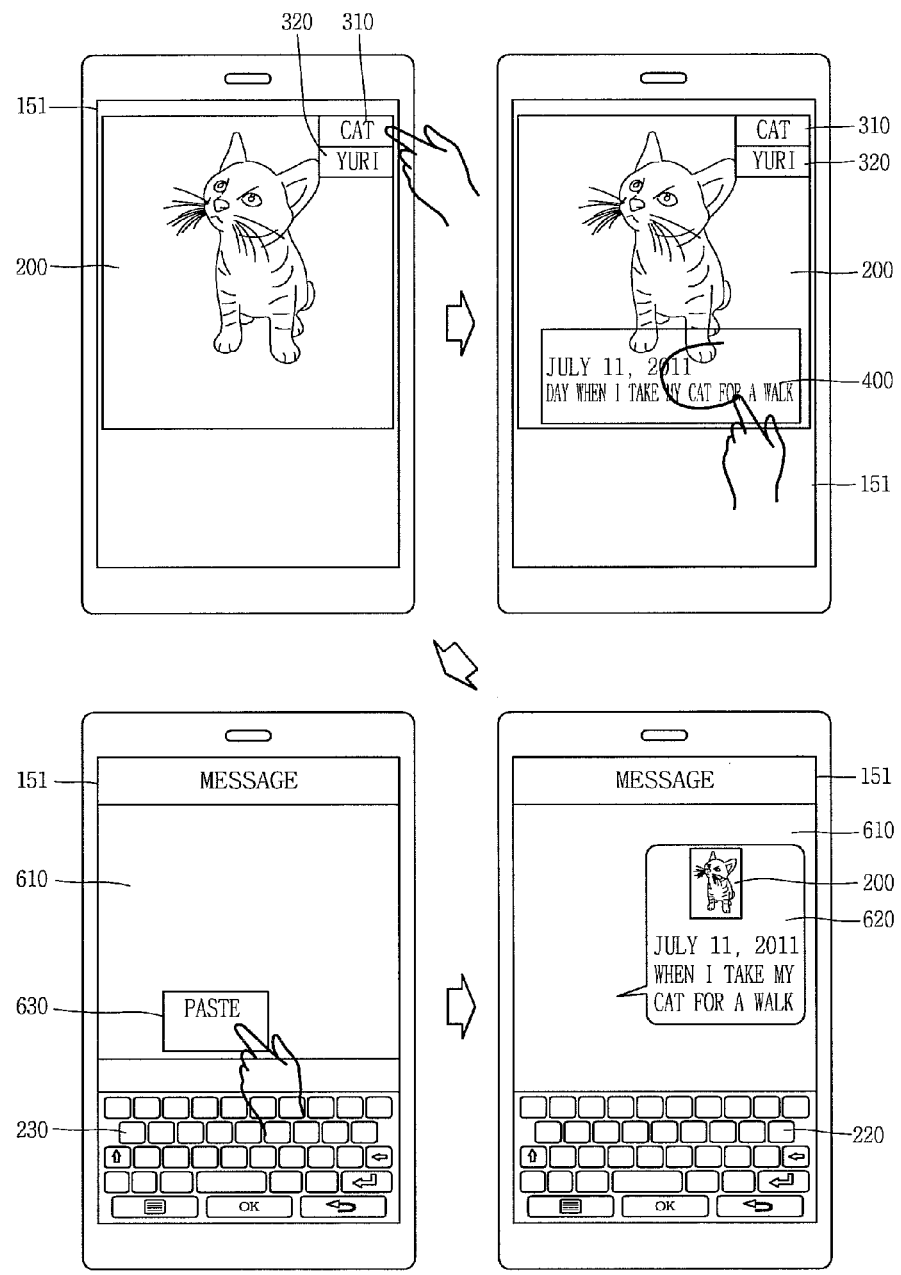

FIGS. 8A, 8B, and 8C are conceptual views illustrating a method of outputting stored data in a mobile terminal according to an exemplary embodiment disclosed in this specification.

While the image 200 is being displayed on the display unit 151, if data is input according to a user's selection, and the input data is stored to be associated with the image 200, the controller 180 displays the icons 310 and 320 on the display unit 151 to indicate that the data has been stored.

Also, when the icon 310 is selected by the user, the stored data is displayed on the display unit 151.

As shown in FIG. 8A, when the store data is displayed on the display unit 151, the controller 180 may display the stored data to overlap with the image 200.

In addition, the controller 180 may display the stored data on the display window 400 and display the display window 400 to overlap with the image 200.

The size of the display window 400 may be changed according to the amount of data stored.

In addition, when a touch corresponding to a predetermined symbol is sensed on the display window 400, the controller 180 may execute a function defined in association with the symbol.

In one example, when a function to delete data is set to a symbol "X," as shown in FIG. 8B, if a touch corresponding to the symbol "X" is input to the display window 400, the controller 180 deletes the stored data.

Also, when a plurality of data items are stored in relation to the image 200, the controller 180 may output another data item to the display window 400.

Therefore, as shown in FIG. 8B, when the touch corresponding to the symbol "X" is input to the display window 400 to which a data item related to the tag "cat" 310 is output, the data item is deleted, and another data item, that is, data stored in relation to the "Yuri" tag 320 is output to the display window 400.

In another example, when a function to copy an image and data is set to a symbol "C", as shown in FIG. 8C, if a touch corresponding to the symbol "C" is input to the display window 400, the controller 180 copies the image and the data.

Also, the image 200 and the data copied can be re-output to a region where the user wants to paste them. For example, when "paste" 630 is selected in the message window 610, the image 200 and the data copied are input to the message 620.

Symbols and functions corresponding to the symbols can be set by the user.

As described above, the mobile terminal and the control method of the same according to this embodiment, the functions related to the image can be executed by using touch input corresponding to simple symbols in the display window.

As set forth above, according to the mobile terminal and the control method of the same according to the exemplary embodiment of the invention, the input window is provided to input data to an image being displayed, so that the user can input information related to the image while viewing the image.

In addition, according to the mobile terminal and the control method of the same according to the exemplary embodiment of the invention, information related to the image is displayed using a keyword, so that the user can easily find out which data is stored in association with the image.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
  a touch screen;
  a controller operatively coupled to the touch screen and configured to:
  control the touch screen to display an image based on a user's selection,
  receive one or more touch inputs applied to the touch screen in a state where the image is displayed on the touch screen,
  display information corresponding to the one or more touch inputs on the touch screen comprising the image,
  detect a control command from the information if the displayed information comprises at least one predetermined symbol, and
  execute a function corresponding to the control command comprised in the displayed information, the function being associated with the image in response to the detected control command,
  wherein, if the displayed information comprises the at least one predetermined symbol, at least part of the displayed information comprising the at least one predetermined symbol is detected as the control command to execute the function and a remaining part of the displayed information except for the at least part of the displayed information is processed as a note,
  wherein the note corresponding to the remaining part of the displayed information is displayed with the image, and the at least part of the displayed information comprising the at least one predetermined symbol is no longer displayed in response to executing the function;
  wherein if the note is stored, an icon is displayed with the image, and
  the icon is located at a corner portion of the image to indicate that the stored note is associated with the image; and
  wherein a tag is extracted from the stored note according to a predetermined criterion, wherein the predetermined criterion is a most mentioned word in the note.

2. The mobile terminal of claim 1, wherein an image effect which is applied for the image is related to the detected control command.

3. The mobile terminal of claim 1, wherein the displayed note comprises text corresponding to the detected control command for executing the function.

4. The mobile terminal of claim 1, wherein an image effect which is applied for the image is a polaroid effect, and the controller controls the touch screen to display the image with a frame image in response to the detected control command.

5. The mobile terminal of claim 4, wherein the note is displayed on at least one of the image or the frame image.

6. The mobile terminal of claim 1, wherein the note is received after a touch input for inputting one or more notes is applied to the touch screen.

7. The mobile terminal of claim 1, wherein the tag related to the stored note is displayed on the icon.

8. A control method of a mobile terminal, the method comprising:
  controlling a touch screen to display an image based on a user's selection;
  receiving one or more touch inputs applied to the touch screen in a state where the image is displayed on the touch screen;
  displaying information corresponding to the one or more touch inputs on the touch screen comprising the image;
  detecting a control command from the information if the displayed information comprises at least one predetermined symbol; and
  executing a function corresponding to the control command comprised in the displayed information, the function being associated with the image in response to the detected control command,
  wherein, if the displayed information comprises the at least one predetermined symbol, at least part of the displayed information comprising the at least one predetermined symbol is detected as the control command to execute the function and a remaining part of the displayed information except for the at least part of the displayed information is processed as a note,
  wherein the note corresponding to the remaining part of the displayed information is displayed with the image, and the at least part of the displayed information comprising the at least one predetermined symbol is no longer displayed in response to executing the function;
  wherein if the note is stored, an icon is displayed with the image, and
  the icon is located at a corner portion of the image to indicate that the stored note is associated with the image; and
  wherein a tag is extracted from the stored note according to a predetermined criterion, wherein the predetermined criterion is a most mentioned word in the note.

9. The method of claim 8, wherein an image effect which is applied to the image is related to the detected control command.

10. The method of claim 8, wherein the displayed note comprises text corresponding to the detected control command for executing the function.

11. The method of claim 8, wherein an image effect which is applied to the image is a polaroid effect, and the image is displayed with a frame image on the touch screen in response to the detected control command.

12. The method of claim 11, wherein the note is displayed on at least one of the image or the frame image.

13. The method of claim 8, wherein the note is received after a touch input for inputting one or more notes is applied to the touch screen.

14. The method of claim 8, wherein the tag related to the stored note is displayed on the icon.

* * * * *